United States Patent
Wang et al.

(10) Patent No.: US 12,341,352 B2
(45) Date of Patent: Jun. 24, 2025

(54) FOREIGN OBJECT DETECTION APPARATUS AND METHOD AND WIRELESS CHARGER

(71) Applicant: Huawei Digital Power Technologies Co., Ltd., Shenzhen (CN)

(72) Inventors: Shuyang Wang, Shenzhen (CN); Zhixian Wu, Dongguan (CN); Yanding Liu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 218 days.

(21) Appl. No.: 17/969,056

(22) Filed: Oct. 19, 2022

(65) Prior Publication Data
US 2023/0126693 A1    Apr. 27, 2023

(30) Foreign Application Priority Data
Oct. 27, 2021   (CN) .......................... 202111260786.7

(51) Int. Cl.
*H02J 50/60*   (2016.01)
*B60L 53/124*  (2019.01)
*H02J 50/12*   (2016.01)
*H02J 50/80*   (2016.01)

(52) U.S. Cl.
CPC ............ *H02J 50/60* (2016.02); *B60L 53/124* (2019.02); *H02J 50/12* (2016.02); *H02J 50/80* (2016.02)

(58) Field of Classification Search
CPC . H02J 50/12; H02J 50/60; H02J 50/80; B60L 53/00
See application file for complete search history.

(56) References Cited

U.S. PATENT DOCUMENTS

| | | | | |
|---|---|---|---|---|
| 9,612,353 | B2* | 4/2017 | Murakami | H02J 50/12 |
| 10,476,313 | B2* | 11/2019 | Nguyen | H01F 38/14 |
| 10,505,401 | B2* | 12/2019 | Yang | H02J 50/12 |
| 2014/0015329 | A1* | 1/2014 | Widmer | B60L 53/12 |
| | | | | 307/104 |
| 2017/0018977 | A1* | 1/2017 | Van Wageningen | H02J 50/80 |

(Continued)

FOREIGN PATENT DOCUMENTS

EP    3799259 A1    3/2021

*Primary Examiner* — Rexford N Barnie
*Assistant Examiner* — Joseph N Inge
(74) *Attorney, Agent, or Firm* — Maier & Maier, PLLC (57) ABSTRACT

A foreign object detection apparatus and method, and a wireless charger. In the foreign object detection apparatus, a signal generation module generates a first calibration excitation signal based on first indication information received from a processing module and generates at least two first calibration carrier signals based on the first indication information. A phase difference detection module determines, based on each first calibration carrier signal and a first current signal obtained by a foreign object detection module under an action of the first calibration excitation signal, a first phase difference between each first calibration carrier signal and the first current signal. The processing module determines a target initial phase based on the first phase difference, and then generates second indication information. The second indication information indicates the signal generation module to generate a detection carrier signal whose initial phase is the target initial phase.

19 Claims, 6 Drawing Sheets

(56) References Cited

U.S. PATENT DOCUMENTS

| | | | | |
|---|---|---|---|---|
| 2017/0033591 A1* | 2/2017 | Govindaraj | ............ | H02J 50/10 |
| 2018/0286211 A1* | 10/2018 | Yap | .......................... | G08B 5/36 |
| 2019/0027973 A1* | 1/2019 | Baek | ...................... | H02J 50/80 |
| 2019/0052126 A1* | 2/2019 | Lee | .......................... | H02J 50/60 |
| 2019/0068001 A1* | 2/2019 | Lovas | ..................... | H02J 50/60 |
| 2019/0190320 A1* | 6/2019 | Park | ........................ | H02J 50/12 |
| 2019/0334388 A1* | 10/2019 | Van Wageningen | .... | H02J 50/60 |
| 2020/0328625 A1* | 10/2020 | Mills | ...................... | G01V 3/101 |
| 2020/0343765 A1* | 10/2020 | Kwon | ..................... | H02J 50/80 |
| 2021/0119494 A1* | 4/2021 | Mao | ........................ | H02J 50/60 |
| 2021/0257862 A1* | 8/2021 | Muratov | ................. | H02J 50/60 |

* cited by examiner

FOREIGN OBJECT DETECTION APPARATUS AND METHOD AND WIRELESS CHARGER

CROSS-REFERENCE TO RELATED APPLICATION

This application claims priority to Chinese Patent Application No. 202111260786.7, filed on Oct. 27, 2021, which is hereby incorporated by reference in its entirety.

TECHNICAL FIELD

The embodiments relate to the field of wireless charging technologies, a foreign object detection apparatus and method, and a wireless charger.

BACKGROUND

A wireless charging system includes a transmitting apparatus of a wireless charger and a receiving apparatus of a to-be-charged device. When the wireless charging system works, a high-frequency electromagnetic field is formed between the transmitting apparatus and the receiving apparatus to perform energy transmission. If a metal foreign object such as a coin, a tin foil, or a paper clip exists between the transmitting apparatus and the receiving apparatus, the metal foreign object generates an eddy effect in the high-frequency electromagnetic field, leading to heating of the metal foreign object and even causing an open flame. Consequently, damage is caused to the wireless charging system. Therefore, it needs to be detected whether a foreign object exists between the transmitting apparatus and the receiving apparatus in the wireless charging system.

A foreign object detection apparatus in the conventional technology detects a foreign object based on a foreign object detection module disposed between the transmitting apparatus and the receiving apparatus. For example, when no metal foreign object exists between the transmitting apparatus and the receiving apparatus, an inductance value of the foreign object detection module is L1; and when a metal foreign object exists between the transmitting apparatus and the receiving apparatus, the inductance value of the foreign object detection module changes to L2 due to impact of mutual inductance. Therefore, when an excitation signal in the foreign object detection apparatus passes through a foreign object detection module with a different inductance value, phase angles of an obtained output current and a preset carrier signal are different. It may be determined, by detecting a phase difference between the output current and the preset carrier signal, whether a foreign object exists between the transmitting apparatus and the receiving apparatus. This type of foreign object detection in the conventional technology has many detection errors and low accuracy.

SUMMARY

The embodiments may provide a foreign object detection apparatus and method and a wireless charger, to calibrate at least one of a circuit error and a frequency error in the foreign object detection apparatus and improve foreign object detection precision.

According to a first aspect, an embodiment may provide a foreign object detection apparatus. The foreign object detection apparatus includes a signal generation module, a foreign object detection module, a phase difference detection module, and a processing module. The signal generation module generates a first calibration excitation signal based on first indication information received from the processing module and generates at least two first calibration carrier signals with different initial phases by a preset phase step within a preset phase range based on the first indication information. The phase difference detection module determines, based on each first calibration carrier signal and a first current signal obtained by the foreign object detection module under an action of the first calibration excitation signal, a first phase difference between each first calibration carrier signal and the first current signal. The processing module determines a target initial phase based on the first phase difference between each first calibration carrier signal and the first current signal and generates second indication information based on the target initial phase. The second indication information is used to indicate the signal generation module to generate a detection carrier signal whose initial phase is the target initial phase, and the detection carrier signal is used for foreign object detection. In this embodiment, the signal generation module may generate one first calibration excitation signal and a plurality of first calibration carrier signals with different initial phases and may determine an initial phase of the detection carrier signal by comparing first phase differences between the first current signal obtained from the first calibration excitation signal and the first calibration carrier signals with different initial phases. In this embodiment, on the basis of the conventional technology, a switch in the foreign object detection module may be added and the switch may be used to calibrate the initial phase of the detection carrier signal during foreign object detection, to reduce a detection error caused by a signal transmission circuit, a signal sampling component, and the like during foreign object detection, and improve foreign object detection precision.

With reference to the first aspect, in a first possible implementation, the foreign object detection module includes a resonant submodule and a switch connected in parallel to the resonant submodule. The first current signal is obtained from the first calibration excitation signal that passes, when the switch is closed, through a branch circuit in which the switch is disposed.

With reference to the first aspect or the first possible implementation of the first aspect, in a second possible implementation, the phase difference detection module may modulate the first current signal obtained by the foreign object detection module under the action of the first calibration excitation signal to a fundamental wave of each first calibration carrier signal, to obtain a first modulation signal corresponding to each first calibration carrier signal; and may determine the first phase difference between each first calibration carrier signal and the first current signal based on a low frequency component of the first modulation signal corresponding to each first calibration carrier signal.

With reference to any one of the first aspect and the foregoing possible implementations of the first aspect, in a third possible implementation, the target initial phase is an initial phase of a target calibration carrier signal, and a phase difference change rate corresponding to the target calibration carrier signal is the largest in phase difference change rates corresponding to the first calibration carrier signals. A phase difference change rate corresponding to any first calibration carrier signal is determined based on a first phase difference between the any first calibration carrier signal and the first current signal and a first phase difference between a second calibration carrier signal and the first current signal. An initial phase of the second calibration carrier signal is greater than an initial phase of the any first calibration carrier signal by the preset phase step.

With reference to the first aspect or the first and the second possible implementations of the first aspect, in a fourth possible implementation, the processing module may determine a target initial phase based on the first phase difference between each first calibration carrier signal and the first current signal. The processing module fits the first phase difference between each first calibration carrier signal and the first current signal and an initial phase of each first calibration carrier signal into a first curve, and determines, as the target initial phase, an initial phase corresponding to a first position in the first curve. A slope of the first curve at the first position is greater than a slope of the first curve at another position. In this embodiment, a slope of the first curve rather than an absolute value of the first phase difference may be used to determine the target initial phase, so that an error caused by zero drift can be avoided, and precision is high.

With reference to any one of the first aspect and the foregoing possible implementations of the first aspect, in a fifth possible implementation, the signal generation module further generates a third calibration carrier signal based on third indication information received from the processing module, and generates at least two second calibration excitation signals with different frequencies by a preset frequency step within a preset frequency range based on the third indication information. The phase difference detection module further determines, based on the third calibration carrier signal and each second current signal that is correspondingly obtained by the foreign object detection module under an action of each second calibration excitation signal, a second phase difference between the third calibration carrier signal and each second current signal. The processing module further determines a target calibration excitation signal from the second calibration excitation signals based on the second phase difference between the third calibration carrier signal and each second current signal and generates fourth indication information based on a frequency of the target calibration excitation signal. The fourth indication information is used to indicate the signal generation module to generate a detection excitation signal, a frequency of the detection excitation signal is the frequency of the target calibration excitation signal, and both the detection excitation signal and the detection carrier signal are used for foreign object detection. In this embodiment, the signal generation module may generate the third calibration carrier signal and a plurality of second calibration excitation signals with different frequencies and may determine the frequency of the detection excitation signal by comparing second phase differences between the second current signals obtained from the second calibration excitation signals with different frequencies and the third calibration carrier signal. In this embodiment, the frequency of the detection excitation signal may be calibrated during foreign object detection, to avoid an error caused by a difference between the frequency of the detection excitation signal and a resonance frequency of a resonant capacitor and a resonant inductor and improve foreign object detection precision.

With reference to the fifth possible implementation of the first aspect, in a sixth possible implementation, the foreign object detection module includes a resonant submodule and a switch connected in parallel to the resonant submodule. A resonance frequency of the resonant submodule is a frequency of the detection carrier signal and the detection excitation signal. Each second current signal is obtained from each second calibration excitation signal that passes, when the switch is open, through a branch circuit in which the resonant submodule is disposed.

With reference to the fifth possible implementation of the first aspect or the sixth possible implementation of the first aspect, in a seventh possible implementation, the phase difference detection module may further determine, based on the third calibration carrier signal and each second current signal that is correspondingly obtained by the foreign object detection module under an action of each second calibration excitation signal, a second phase difference between the third calibration carrier signal and each second current signal. The phase difference detection module modulates each second current signal that is correspondingly obtained by the foreign object detection module under the action of each second calibration excitation signal to the third calibration carrier signal, to obtain a second modulation signal corresponding to each second calibration excitation signal; and determines the second phase difference between the third calibration carrier signal and each second current signal based on a low frequency component of the second modulation signal corresponding to each second calibration excitation signal.

With reference to the fifth possible implementation to the seventh possible implementation of the first aspect, in an eighth possible implementation, a second calibration excitation signal with the largest phase difference change rate in phase difference change rates corresponding to the second calibration excitation signals may be the target calibration excitation signal. A phase difference change rate corresponding to any second calibration excitation signal is determined based on a second phase difference between a third carrier signal and a second current signal corresponding to the any second calibration excitation signal and a second phase difference between the third carrier signal and a second current signal corresponding to a third calibration excitation signal. A frequency of the third calibration excitation signal is greater than a frequency of the any second calibration excitation signal by the preset frequency step.

With reference to any one of the fifth possible implementation to the seventh possible implementation of the first aspect, in a ninth possible implementation, that the processing module further determines a target calibration excitation signal from the second calibration excitation signals based on the second phase difference between the third calibration carrier signal and each second current signal may be that the processing module is configured to fit the second phase difference between the third calibration carrier signal and each second current signal into a second curve, and determines, as the target calibration excitation signal, a second calibration excitation signal corresponding to a second position in the second curve. A slope of the second curve at the second position is greater than a slope of the second curve at another position. In this embodiment, a slope of the second curve rather than an absolute value of the second phase difference may be used to determine the target excitation signal, so that an error caused by zero drift can be avoided, and precision is high.

According to a second aspect, an embodiment may provide a foreign object detection method. The foreign object detection method includes: generating a first calibration excitation signal, and generating at least two first calibration carrier signals with different initial phases by a preset phase step within a preset phase range; determining, based on each first calibration carrier signal and a first current signal that is obtained by a foreign object detection apparatus under an action of the first calibration excitation signal, a first phase difference between each first calibration carrier signal and the first current signal; and determining a target initial phase based on the first phase difference between each first calibration carrier signal and the first current signal, and generating a detection carrier signal whose initial phase is the target initial phase. The initial phase of the detection carrier signal is the target initial phase, and the detection carrier signal is used by the foreign object detection apparatus for foreign object detection.

With reference to the second aspect, in a first possible implementation, based on each first calibration carrier signal and a first current signal that is obtained by a foreign object detection apparatus under an action of the first calibration excitation signal, a first phase difference between each first calibration carrier signal and the first current signal may be determined. Modulating the first current signal obtained by the foreign object detection apparatus under the action of the first calibration excitation signal to a fundamental wave of each first calibration carrier signal may obtain a first modulation signal corresponding to each first calibration carrier signal. The first phase difference may be determined between each first calibration carrier signal and the first current signal based on a low frequency component of the first modulation signal corresponding to each first calibration carrier signal.

With reference to the second aspect or the first possible implementation of the second aspect, in a second possible implementation, the target initial phase is an initial phase of a target calibration carrier signal, and a phase difference change rate corresponding to the target calibration carrier signal is the largest in phase difference change rates corresponding to the first calibration carrier signals. A phase difference change rate corresponding to any first calibration carrier signal is determined based on a first phase difference between the any first calibration carrier signal and the first current signal and a first phase difference between a second calibration carrier signal and the first current signal. An initial phase of the second calibration carrier signal is greater than an initial phase of the any first calibration carrier signal by the preset phase step.

With reference to the second aspect or the first possible implementation of the second aspect, in a third possible implementation, a target initial phase based on the first phase difference between each first calibration carrier signal and the first current signal may be determined by fitting the first phase difference between each first calibration carrier signal and the first current signal and an initial phase of each first calibration carrier signal into a first curve, and determining, as the target initial phase, an initial phase corresponding to a first position in the first curve. A slope of the first curve at the first position is greater than a slope of the first curve at another position.

With reference to any one of the second aspect and the foregoing possible implementations of the second aspect, in a fourth possible implementation, the foreign object detection method further includes: generating a third calibration carrier signal, and generating at least two second calibration excitation signals with different frequencies by a preset frequency step within a preset frequency range; determining, based on the third calibration carrier signal and each second current signal that is correspondingly obtained by the foreign object detection apparatus under an action of each second calibration excitation signal, a second phase difference between the third calibration carrier signal and each second current signal; and determining a target calibration excitation signal from the second calibration excitation signals based on the second phase difference between the third calibration carrier signal and each second current signal, and generating a detection excitation signal based on a frequency of the target calibration excitation signal. A frequency of the detection excitation signal is the frequency of the target calibration excitation signal, and both the detection excitation signal and the detection carrier signal are used by the foreign object detection apparatus for foreign object detection.

With reference to the fourth possible implementation of the second aspect, in a fifth possible implementation, based on the third calibration carrier signal and each second current signal that is correspondingly obtained by the foreign object detection apparatus under an action of each second calibration excitation signal, a second phase difference between the third calibration carrier signal and each second current signal may be determined by modulating each second current signal that is correspondingly obtained by the foreign object detection apparatus under the action of each second calibration excitation signal to the third calibration carrier signal, to obtain a second modulation signal corresponding to each second calibration excitation signal; and determining the second phase difference between the third calibration carrier signal and each second current signal based on a low frequency component of the second modulation signal corresponding to each second calibration excitation signal.

With reference to the fourth possible implementation of the second aspect or the fifth possible implementation of the second aspect, in a sixth possible implementation, a second calibration excitation signal with the largest phase difference change rate in phase difference change rates corresponding to the second calibration excitation signals may be the target calibration excitation signal. A phase difference change rate corresponding to any second calibration excitation signal is determined based on a second phase difference between a third carrier signal and a second current signal corresponding to the any second calibration excitation signal and a second phase difference between the third carrier signal and a second current signal corresponding to a third calibration excitation signal. A frequency of the third calibration excitation signal is greater than a frequency of the any second calibration excitation signal by the preset frequency step.

With reference to the fourth possible implementation of the second aspect or the fifth possible implementation of the second aspect, in a seventh possible implementation, a target calibration excitation signal from the second calibration excitation signals based on the second phase difference between the third calibration carrier signal and each second current signal may be determined by fitting the second phase difference between the third calibration carrier signal and each second current signal into a second curve, and determining, as the target calibration excitation signal, a second calibration excitation signal corresponding to a second position in the second curve. A slope of the second curve at the second position is greater than a slope of the second curve at another position.

According to a third aspect, an embodiment may provide a wireless charger. The wireless charger includes a voltage inverter and the foreign object detection apparatus described in any one of the first aspect and the possible implementations of the first aspect. The voltage converter is disposed between a power supply and the foreign object detection apparatus and converts a voltage output by the power supply into a high-frequency alternating current provided for the foreign object detection apparatus.

It should be understood that implementations and beneficial effects of the foregoing plurality of aspects may be mutually referenced.

DETAILED DESCRIPTION OF THE EMBODIMENTS

The following clearly describes the embodiments with reference to the accompanying drawings. It is clear that the described embodiments are some but not all of the embodiments. All other embodiments obtained by a person of ordinary skill in the art based on the embodiments without creative efforts shall fall within the scope of the embodiments.

A foreign object detection apparatus may be applicable to detecting, before a wireless charger charges a to-be-charged device that supports a wireless charging function, whether a metal foreign object exists between a transmitting apparatus of the wireless charger and a receiving apparatus of the to-be-charged device to further determine whether a wireless charging system can be enabled and/or detecting, in a process in which the wireless charger charges the to-be-charged device, whether a metal foreign object falls between the transmitting apparatus and the receiving apparatus to further determine whether to disable the wireless charging system or adjust transmit power of the wireless charging system.

With reference to the accompanying drawings, the following further describes in detail implementation of the embodiments.

Figure 1:
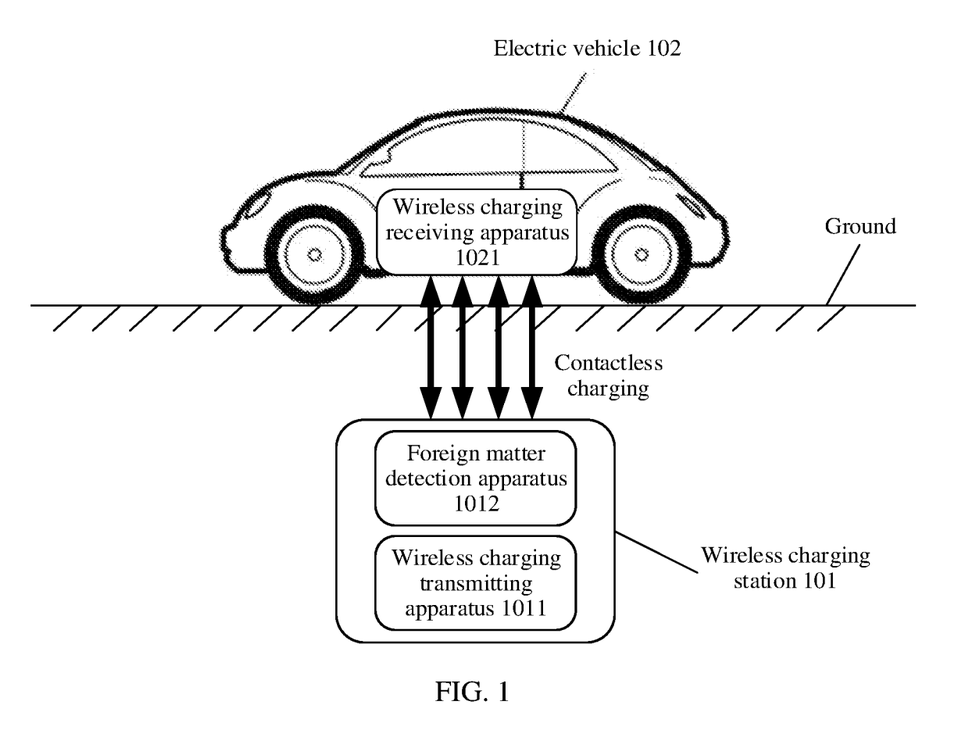
FIG. 1 is a schematic diagram of a scenario of a wireless charging system for an electric vehicle according to an embodiment.

FIG. 1 is a schematic diagram of a scenario of a wireless charging system for an electric vehicle according to an embodiment. As shown in FIG. 1, an example in which the wireless charger is disposed in a wireless charging station 101 and a to-be-charged device is an electric vehicle 102 is used to describe the wireless charging system in detail.

It may be understood that the wireless charging system including the foreign object detection apparatus provided in embodiments may be applied to a wireless charging scenario of the electric vehicle and may be further applied to a wireless charging scenario of a mobile terminal (for example, a mobile phone or a tablet computer), an intelligent robot, or the like. An application scenario of the wireless charging system is not limited in this embodiment.

The wireless charging station 101 may be disposed in various scenarios such as a parking lot, a private parking space, and a charging station platform. The wireless charging station 101 includes a wireless charging transmitting apparatus 1011 and a foreign object detection apparatus 1012.

For example, a placement position of the wireless charging transmitting apparatus 1011 is parallel to or overlaps with the ground, and the wireless charging transmitting apparatus 1011 may be buried under the ground or disposed above the ground (not shown in the figure). The wireless charging transmitting apparatus 1011 may include a transmitting coil.

The foreign object detection apparatus 1012 is disposed between the wireless charging transmitting apparatus 1011 and a wireless charging receiving apparatus 1021 and may be disposed on a surface of the wireless charging transmitting apparatus 1011. Generally, when the wireless charging system performs contactless charging, the to-be-charged device (for example, the electric vehicle 102) is located above the wireless charging transmitting apparatus 1011. Therefore, a probability that a metal foreign object exists on the surface of the wireless charging transmitting apparatus 1011 or falls on the surface of the wireless charging transmitting apparatus 1011 is relatively large. In FIG. 1, an example in which the foreign object detection apparatus 1012 is disposed in the wireless charging station and is disposed on the surface of the wireless charging transmitting apparatus 1011 is used. It may be understood that the foreign object detection apparatus 1012 is disposed between the wireless charging transmitting apparatus 1011 and the wireless charging receiving apparatus 1021 and may be disposed on a surface of the wireless charging receiving apparatus 1021 (not shown in the figure). In this case, the electric vehicle 102 has a foreign object detection function.

The electric vehicle 102 includes the wireless charging receiving apparatus 1021. The wireless charging receiving apparatus 1021 may be integrated into a chassis of the electric vehicle 102 and parallel to the ground. The wireless charging receiving apparatus 1021 may include a receiving coil and a rectifier circuit. The receiving coil and the rectifier circuit may be integrated together or may be disposed separately. The rectifier circuit may rectify an alternating current on the receiving coil to a direct current and provide the direct current to a power battery and/or a battery in the electric vehicle 102.

The wireless charging transmitting apparatus 1011 and the wireless charging receiving apparatus 1021 perform wireless energy transmission through magnetic field coupling (for example, electromagnetic induction or magnetic resonance).

In some feasible implementations, the electric vehicle 102 and the wireless charging station 101 may perform bidirectional charging, in other words, the wireless charging station 101 may charge the electric vehicle 102, and the electric vehicle 102 may also discharge to the wireless charging station 101.

Figure 2:
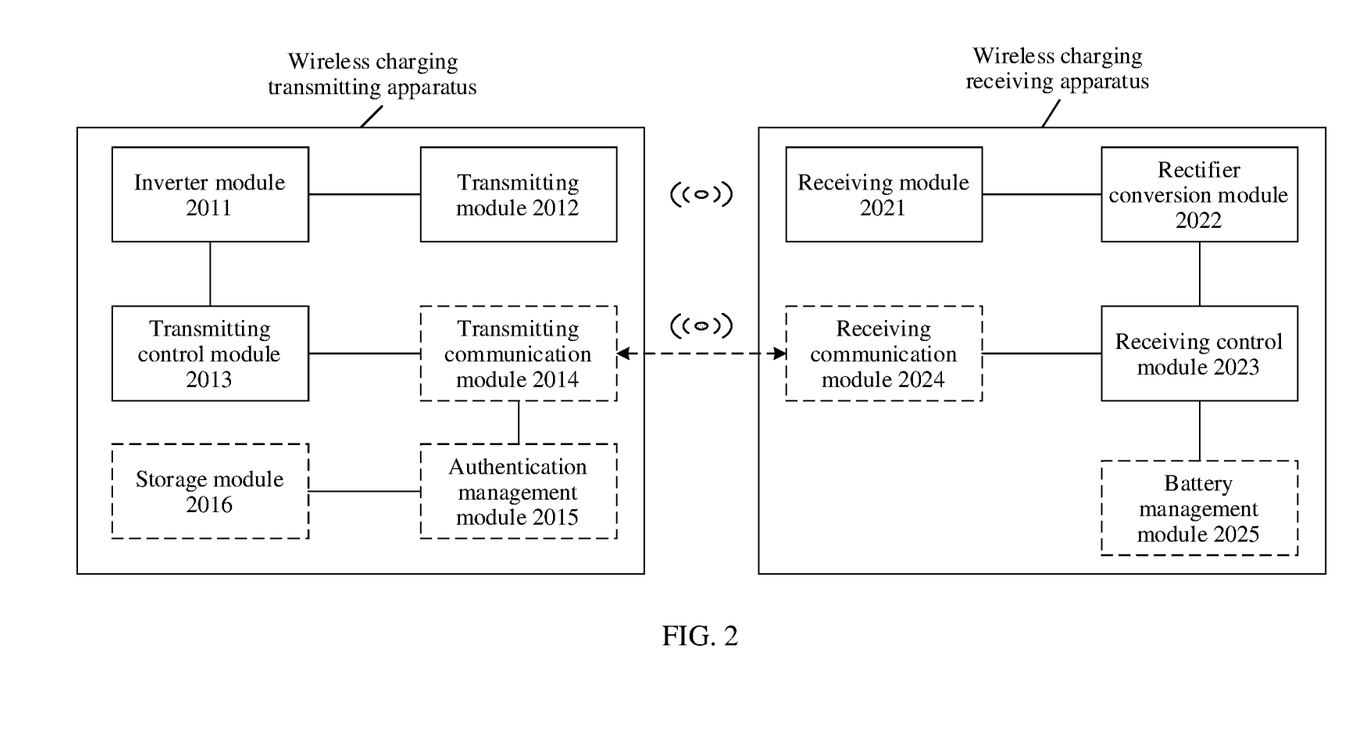
FIG. 2 is a block diagram of structures of a wireless charging transmitting apparatus and a wireless charging receiving apparatus according to an embodiment.

To better understand this embodiment, the following describes examples of the wireless charging transmitting apparatus and the wireless charging receiving apparatus in the wireless charging system. FIG. 2 is a block diagram of structures of a wireless charging transmitting apparatus and a wireless charging receiving apparatus according to an embodiment. As shown in FIG. 2, the wireless charging transmitting apparatus includes an inverter module 2011, a transmitting module 2012 connected to the inverter module 2011, and a transmitting control module 2013 connected to the inverter module 2011.

The inverter module 2011 may be connected to a power supply. If the power supply outputs a direct current, the inverter module 2011 may directly convert the direct current into a high-frequency alternating current provided for the transmitting module 2012. If the power supply (for example, an alternating power grid) outputs an alternating current, the inverter module 2011 may first rectify the alternating current, and then invert the current into a high-frequency alternating current provided for the transmitting module 2012. Optionally, when the power supply outputs an alternating current, the wireless charging transmitting apparatus may further include a power factor correction module (not shown in the figure). The power factor correction module can reduce a phase difference between a voltage and a current of an alternating current, so that a harmonic content of a wireless charging system is reduced. It may be understood that, for circuit implementation of the inverter module 2011 or the power factor correction module, reference may be made to the conventional technology, and details are not described herein.

The transmitting module 2012 includes an inductive component and a capacitive component. For example, a transmitting coil and a first resonant capacitor may be included. When the inverter module 2011 provides a high-frequency alternating current, the transmitting coil performs LC resonance with the first resonant capacitor, and the transmitting coil generates a magnetic field under an action of the high-frequency alternating current.

The transmitting control module 2013 may control, based on a power requirement in the wireless charging system, a voltage, and a frequency of the high-frequency alternating current output by the inverter module 2011.

The wireless charging receiving apparatus includes a receiving module 2021, a rectifier conversion module 2022 connected to the receiving module 2021, and a receiving control module 2023 connected to the rectifier conversion module 2022.

The receiving module 2021 includes an inductive component and a capacitive component. For example, a receiving coil and a second resonant capacitor may be included. The receiving coil may generate electricity by using magnetism in the magnetic field generated by the transmitting coil and perform LC resonance with the second resonant capacitor to obtain an alternating current. In other words, the transmitting module 2012 and the receiving module 2021 perform wireless energy transmission through magnetic resonance.

The rectifier conversion module 2022 rectifies, into a direct current, the alternating current output by the receiving module 2021, and converts a voltage of the direct current into a voltage required by an energy storage system in an electric vehicle.

The receiving control module 2023 may control, based on a power requirement of the electric vehicle, a voltage, and a current output by the rectifier conversion module 2022.

Optionally, the wireless charging receiving apparatus may further include a battery management module 2025 connected to the receiving control module 2023. The battery management module 2025 may send a power requirement instruction to the receiving control module 2023 based on any one or more parameters such as a voltage, a current, and a temperature of a power battery or a battery in the electric vehicle, and the receiving control module 2023 controls, based on the power requirement instruction, the voltage and the current output by the rectifier conversion module 2022.

In some feasible implementations, communication may be performed between the wireless charging transmitting apparatus and the wireless charging receiving apparatus. That is, the wireless charging transmitting apparatus may further include a transmitting communication module 2014, and the wireless charging receiving apparatus may further include a receiving communication module 2024. In implementation, a wireless communication manner is used between the transmitting communication module 2014 and the receiving communication module 2024. For example, the wireless communication manner may be Bluetooth, wireless fidelity (WiFi), Zigbee, radio frequency identification (RFID), a long range (Lora) wireless technology, or near field communication (NFC).

Communication transmission of information such as power control, failure protection, power on/off, and interactive authentication may be performed between the transmitting communication module 2014 and the receiving communication module 2024. For example, the transmitting communication module 2014 may receive a charging request of the electric vehicle from the receiving communication module 2024. The charging request carries a vehicle model, power information, interactive authentication information, and the like of the electric vehicle.

Optionally, the wireless charging transmitting apparatus further includes an authentication management module 2015 and a storage module 2016. When the transmitting communication module 2014 receives the charging request of the electric vehicle, the authentication management module 2015 may obtain interactive authentication information of the electric vehicle from the storage module 2016, compare the interactive authentication information carried in the charging request with the interactive authentication information obtained from the storage module 2016, and determine that the wireless charging transmitting apparatus can transmit energy to the wireless charging receiving apparatus if the two pieces of information are the same.

Figure 3:
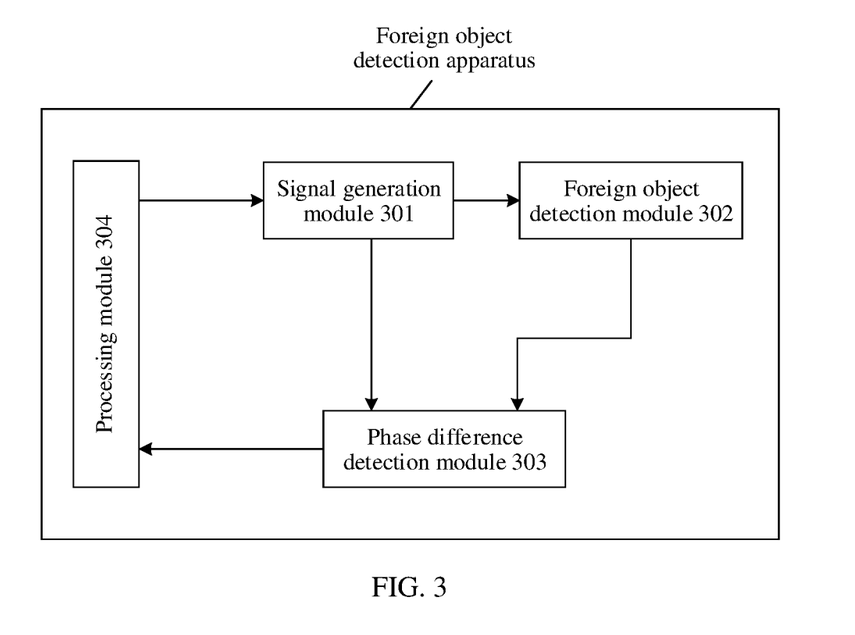
FIG. 3 is a block diagram of a structure of a foreign object detection apparatus according to an embodiment.

The following describes an example of a foreign object detection apparatus. FIG. 3 is a block diagram of a structure of a foreign object detection apparatus according to an embodiment. As shown in FIG. 3, the foreign object detection apparatus is disposed between a wireless charging transmitting apparatus and a wireless charging receiving apparatus, and the foreign object detection apparatus includes a signal generation module 301, a foreign object detection module 302, a phase difference detection module 303, and a processing module 304.

An input end of the signal generation module 301 is connected to an output end of the processing module 304, and an output end of the signal generation module 301 is connected to an input end of the foreign object detection module 302 and a first input end of the phase difference detection module 303. An output end of the foreign object detection module 302 is connected to a second input end of the phase difference detection module 303, and an output end of the phase difference detection module 303 is connected to an input end of the processing module 304.

In implementation, the signal generation module 301 generates a first calibration excitation signal based on first indication information received from the processing module 304 and generates at least two first calibration carrier signals with different initial phases by a preset phase step within a preset phase range based on the first indication information. In this case, the signal generation module 301 generates one first calibration excitation signal and at least two first calibration carrier signals with different initial phases.

In some feasible implementations, the signal generation module 301 and the processing module 304 may be presented as one controller. The controller may be, for example, a central processing unit (CPU), another general-purpose processor, a digital signal processor (DSP), an application specific integrated circuit (ASIC), a field-programmable gate array (FPGA) or another programmable logic device, a discrete gate or transistor logic device, or a discrete hardware component.

Figure 4:
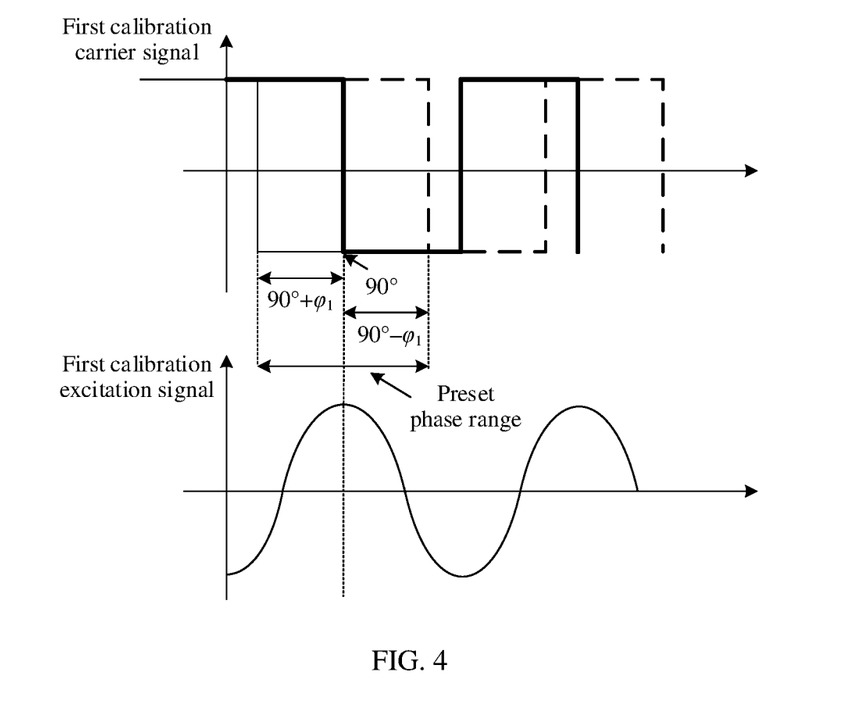
FIG. 4 is a schematic diagram of waveforms of a first carrier signal and a first excitation signal according to an embodiment.

For a relationship between an initial phase of each first calibration carrier signal and an initial phase of the first calibration excitation signal, refer to FIG. 4. In FIG. 4, the initial phase of the first calibration carrier signal represented by a solid line part leads the initial phase of the first calibration excitation signal by 90°. For example, if the first calibration excitation signal is represented as $B_0 \sin(w_1 t)$, a fundamental wave signal of the first calibration carrier signal represented by the solid line part is represented as $A_0 \sin(w_1 t+90°)$. The first calibration carrier signal represented by the solid line part is used as an intermediate value to shift a phase to the left and the right by $\varphi_1$, to obtain first calibration carrier signals with different initial phases. That is, relative to the first calibration excitation signal, an angle by which an initial phase of each first calibration carrier signal leads the first calibration excitation signal changes within an interval $(90°-\varphi_1, 90°+\varphi_1)$. In this case, a fundamental wave signal of each first calibration carrier signal may be represented as $A_0 \sin(w_1 t+90°+\varphi)$, where $-\varphi_1<\varphi<\varphi_1$, $A_0$ and $B_0$ are all constants.

It may be understood that $\varphi_1$ is a preset value, and a value of $\varphi_1$ may be set based on a scenario in which the wireless charger is disposed and may be adjusted based on different scenarios in which the wireless charger is disposed and different power required by the to-be-charged device.

The signal generation module 301 transmits the first calibration excitation signal $B_0 \sin(w_1 t)$ to the foreign object detection module 302, and the foreign object detection module 302 obtains a first current signal $B_0 \sin(w_1 t+\alpha_1)$ under an action of the first calibration excitation signal $B_0 \sin(w_1 t)$. $\alpha_1$ represents phase leading or lagging behind caused by a circuit (without a resonance coil) in the foreign object detection apparatus.

Figure 5:
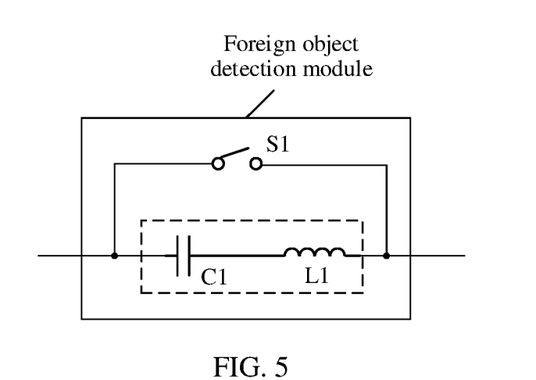
FIG. 5 is a circuit diagram of a foreign object detection module according to an embodiment.
Figure 6:
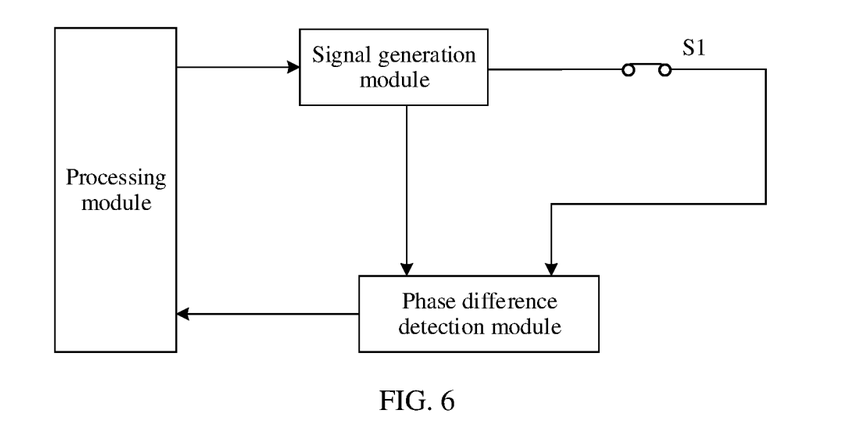
FIG. 6 is a part of an equivalent circuit diagram of a foreign object detection apparatus according to an embodiment.

In some feasible implementations, an internal circuit diagram of the foreign object detection module 302 may be shown in FIG. 5. The foreign object detection module includes a resonant submodule (for example, a resonant capacitor C1 and a resonant coil L1) and a switch S1 connected in parallel to the resonant submodule. The processing module 304 may control the switch S1 to be closed, and when the switch S1 is closed, the first calibration excitation signal $B_0 \sin(w_1$ passes through a branch circuit in which the switch S1 is disposed, and the first current signal $B_0 \sin(w_1 t+\alpha_1)$ is obtained. In this case, the equivalent circuit diagram of the foreign object detection apparatus shown in FIG. 3 may be implemented as a foreign object detection apparatus shown in FIG. 6. As shown in FIG. 6, $\alpha_1$ represents phase leading or phase lagging behind caused by a circuit that transmits an excitation signal between the signal generation module and the phase difference detection module and phase leading or phase lagging behind caused by a sampling component and a sampling circuit for collecting the first current signal in the phase difference detection module. The phase leading or phase lagging behind causes foreign object detection precision to be reduced. Therefore, in this embodiment, an initial phase of a detection carrier signal used for foreign object detection needs to be calibrated, and a calibrated phase of the detection carrier signal is used to neutralize the phase leading or phase lagging behind, to avoid a problem of reduced foreign object detection precision caused by the phase leading or phase lagging behind.

The phase difference detection module 303 may obtain the first current signal and determine a first phase difference between each first calibration carrier signal generated by the signal generation module 301 and the first current signal based on the first current signal and each first calibration carrier signal.

For example, the phase difference detection module 303 may be implemented as a filtering circuit, an amplification circuit, or the like, to convert the first phase difference into a signal that can be processed by the controller. For a circuit structure, refer to the conventional technology. Details are not described herein. Optionally, the phase difference detection module 303 may be integrated into a same controller as the signal generation module 301 and the processing module 304.

In some feasible implementations, the phase difference detection module 303 modulates the first current signal $B_0 \sin(w_1 t+\alpha_1)$ to the fundamental wave signal $A_0 \sin(w_1 t+90°+\varphi)$ of each first calibration carrier signal, to obtain a first modulation signal M1 corresponding to each first calibration carrier signal. In implementation, the first current signal $B_0 \sin(w_1 t+\alpha_1)$ is multiplied by the fundamental wave signal $A_0 \sin(w_1 t+90°+\varphi)$ of each first calibration carrier signal, to obtain the first modulation signal M1 represented as follows:

$$M1=B_0 \sin(w_1 t+\alpha_1) \times A_0 \sin(w_1 t+90°+\varphi) \quad \text{Formula 1}$$

According to a product-to-sum formula of a sine function, Formula 1 may be transformed to:

$$M1=\tfrac{1}{2}A_0 B_0[\sin(2w_1 t+\alpha_1+\varphi)+\sin(\alpha_1-\varphi)] \quad \text{Formula 2}$$

It can be understood from Formula 2 that a low frequency component of the first modulation signal M1 is $\tfrac{1}{2}A_0 B_0 \sin(\alpha_1-\varphi)$, where $-\varphi_1<\varphi<\varphi_1$.

The phase difference detection module 303 may determine the first phase difference between each first calibration carrier signal and the first current signal based on the low frequency component of the first modulation signal M1. In implementation, the first phase difference between each first calibration carrier signal and the first current signal is $\alpha_1-\varphi$. Because the low frequency component of the first modulation signal M1 is monotonous in an interval $(-\varphi_1, \varphi_1)$, a value of the first phase difference $\alpha_1-\varphi$ may be reflected by a value of $\sin(\alpha_1-\varphi)$ in the low frequency component of the first modulation signal M1.

The processing module 304 may determine a target initial phase based on the first phase difference between each first calibration carrier signal and the first current signal and generate second indication information based on the target initial phase.

In some feasible implementations, the processing module 304 may determine a target calibration carrier signal by using a phase difference change rate of each first calibration carrier signal and use an initial phase of the target calibration carrier signal as the target initial phase. In implementation, an example in which the preset phase step is represented as $\Delta\varphi$ is used. Assuming that a fundamental wave signal of any first calibration carrier signal is represented as $A_0 \sin(w_1 t+90°+\varphi_2)$, a fundamental wave signal that is of a second calibration carrier signal and that is greater than an initial phase of the any first calibration carrier signal by the preset phase step may be represented as $A_0 \sin(w_1 t+90°+\varphi_2+\Delta\varphi))$, where $-\varphi_1 < \varphi_2 < \varphi_1$.

The phase difference detection module 303 may learn that a low frequency component of an obtained first modulation signal corresponding to the any first calibration carrier signals is $\frac{1}{2}A_0B_0 \sin(\alpha_1-\varphi_2)$, and that a low frequency component of an obtained first modulation signal corresponding to the second calibration carrier signal is $\frac{1}{2}A_0B_0 \sin(\alpha_1-\varphi_2-\Delta\varphi)$. Therefore, a phase difference change rate of the any first calibration carrier signal may be represented as:

$$\Delta V_\varphi = \frac{\frac{1}{2}A_0B_0\sin(\alpha_1-\varphi_2)-\frac{1}{2}A_0B_0\sin(\alpha_1-\varphi_2-\Delta\varphi)}{\Delta\varphi} \quad \text{Formula 3}$$

According to Formula 3, $\varphi$ in the fundamental wave signal $A_0 \sin(w_1 t+90°+\varphi)$ of the first calibration carrier signal is sequentially traversed from $-\varphi_1$ to $\varphi_1$ by the preset phase step $\Delta\varphi$. The processing module 304 may calculate phase difference change rates of all the first calibration carrier signals and may use a first calibration carrier signal with a largest phase difference change rate as the target calibration carrier signal.

Figure 7:
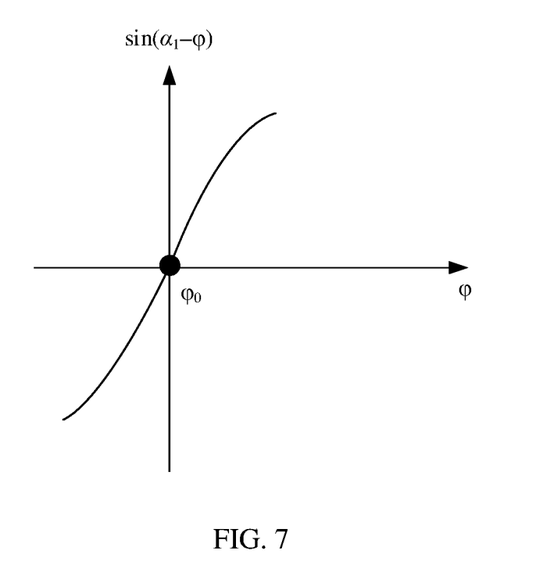
FIG. 7 is a schematic diagram of a waveform of a first curve according to an embodiment.

Optionally, in some feasible implementations, the processing module 304 may fit the first phase difference between each first calibration carrier signal and the first current signal and the initial phase of each first calibration carrier signal into a first curve. It may be understood that, in this embodiment, $\sin(\alpha_1-\varphi)$ is used to reflect information about a value of the first phase difference between the first calibration carrier signal and the first current signal. That is, the first curve may be represented as a curve shown in FIG. 7, $\varphi$ in the initial phase of the first calibration carrier signal is a horizontal coordinate, and a vertical coordinate is $\sin(\alpha_1-\varphi)$. The first curve has a maximum curve slope at $\varphi_0$, and therefore the processing module 304 uses $\varphi_0$ as the target initial phase. In this embodiment, a slope of the first curve rather than an absolute value of the first phase difference is used to determine the target initial phase, so that an error caused by zero drift can be avoided, and precision is high.

The signal generation module 301 generates, based on the second indication information sent by the processing module 304, a detection carrier signal whose initial phase is the target initial phase $\varphi_0$. That is, a fundamental wave signal of the detection carrier signal is represented as $A_0 \sin(w_1 t+90°+\varphi_0)$. The detection carrier signal is used for foreign object detection.

For example, an implementation process of foreign object detection may be as follows: The resonant capacitor C1 and the resonant inductor L1 in the foreign object detection module 302 obtain a first detection current signal under an action of the first calibration excitation signal, and the phase difference detection module 303 obtains a first detection phase difference between the first detection current signal and the detection carrier signal, and determines, based on the first detection phase difference and the first detection current signal, whether a foreign object exists. For example, a first value may be obtained by dividing an amplitude of the first detection phase difference by an amplitude of the first detection current signal. If the first value falls within a preset range, no foreign object exists between the wireless charging transmitting apparatus and the wireless charging receiving apparatus; or if the first value falls beyond the preset range, a foreign object exists between the wireless charging transmitting apparatus and the wireless charging receiving apparatus.

In this embodiment, the signal generation module may generate one first calibration excitation signal and a plurality of first calibration carrier signals with different initial phases and may determine an initial phase of the detection carrier signal by comparing first phase differences between the first current signal obtained from the first calibration excitation signal and the first calibration carrier signals with different initial phases. It may be understood that, in this embodiment, on the basis of the conventional technology, a switch in the foreign object detection module may be added, and the switch may be used to calibrate the initial phase of the detection carrier signal during foreign object detection, to reduce a detection error caused by a signal transmission circuit, a signal sampling component, and the like during foreign object detection, and improve foreign object detection precision.

Further, in some feasible implementations, the signal generation module 301 may further generate a third calibration carrier signal based on third indication information received from the processing module 304 and generate at least two second calibration excitation signals with different frequencies by a preset frequency step with a preset frequency range based on the third indication information.

For example, the at least two second calibration excitation signals with different frequencies are represented as $B_0 \sin (wt)$, where $w_2 < w < w_3$. A fundamental wave signal of the third calibration carrier signal may be represented as $A_0 \sin (wt+90°)$.

The signal generation module 301 transmits each second calibration excitation signal $B_0 \sin (wt)$ to the foreign object detection module 302, and the foreign object detection module 302 obtains, under an action of each second calibration excitation signal $B_0 \sin (wt)$, a second current signal $B_0 \sin (wt+\alpha)$ corresponding to each second calibration excitation signal. $\alpha$ is a phase error caused by a difference between a frequency of the second calibration excitation signal and a resonance frequency of the resonant capacitor C1 and the resonant inductor L1, and calibration excitation signals with different frequencies also cause different phase errors, in other words, a different value of w indicates a change in a value of $\alpha$.

Figure 8:
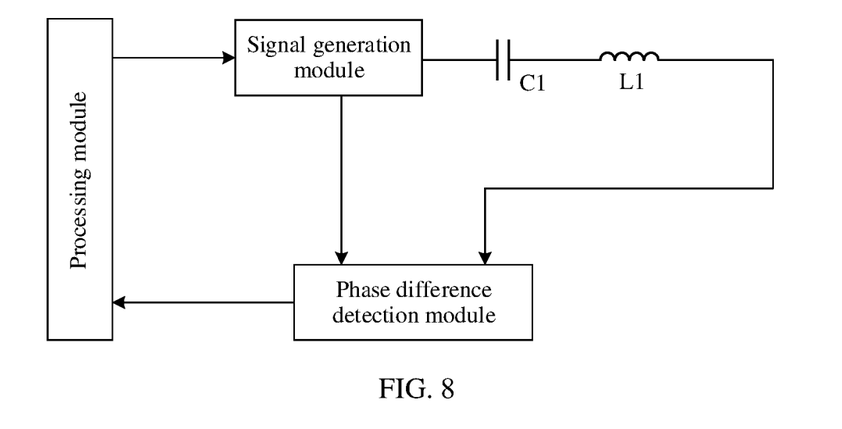
FIG. 8 is another part of an equivalent circuit diagram of a foreign object detection apparatus according to an embodiment.

In some feasible implementations, when the internal circuit diagram of the foreign object detection module 302 is shown in FIG. 5, the processing module 304 may control the switch S1 to be open, and when the switch S1 is open, each second calibration excitation signal $B_0 \sin (wt)$ passes through a branch circuit in which the resonant submodule (for example, the resonant capacitor C1 and the resonant inductor L1) is disposed, and each second current signal $B_0 \sin (wt+a)$ is obtained. In this case, the equivalent circuit diagram of the foreign object detection apparatus shown in FIG. 3 may be implemented as a foreign object detection apparatus shown in FIG. 8, and each second calibration excitation signal acts on the resonant capacitor C1 and the resonant inductor L1.

The phase difference detection module 303 may obtain all the second current signals and may determine a second phase difference between the third calibration carrier signal generated by the signal generation module 301 and each second current signal based on each second current signal and the third calibration carrier signal.

In some feasible implementations, the phase difference detection module 303 modulates each second current signal $B_0 \sin (wt+\alpha)$ to the fundamental wave signal $A_0 \sin (wt+$ 90°) of the third calibration carrier signal, to obtain a second modulation signal M2 corresponding to each second calibration excitation signal. In implementation, each second current signal $B_0 \sin(wt+\alpha)$ is multiplied by the fundamental wave signal $A_0 \sin(wt+90°)$ of each third calibration carrier signal, to obtain the second modulation signal M2 represented as follows:

$$M2 = B_0 \sin(wt+\alpha) \times A_0 \sin(wt+90°) \qquad \text{Formula 4}$$

According to the product-to-sum formula of the sine function, Formula 4 may be transformed to:

$$M2 = \tfrac{1}{2} A_0 B_0 [\sin(2wt+\alpha) + \sin \alpha] \qquad \text{Formula 5}$$

It can be understood from Formula 5 that a low frequency component of the second modulation signal M2 is $\tfrac{1}{2} A_0 B_0 \sin \alpha$.

The phase difference detection module 303 may determine a second phase difference between each second calibration excitation signal and the second current signal based on the low frequency component of the second modulation signal M2.

The processing module 304 may determine a target calibration excitation signal from the second calibration excitation signals based on the second phase difference between the third calibration carrier signal and each second current signal and generate fourth indication information based on a frequency of the target calibration excitation signal.

In some feasible implementations, the processing module 304 may use a second calibration excitation signal with the largest phase difference change rate in phase difference change rates corresponding to the second calibration excitation signals as the target calibration excitation signal. In implementation, an example in which the preset phase step is represented as $\Delta w$ is used. Assuming that any second calibration excitation signal is represented as $B_0 \sin(w_4 t)$, a third calibration excitation signal that is greater than a frequency of the any second calibration excitation signal by the preset frequency may be represented as $B_0 \sin[(w_4+\Delta w) t]$, where $w_2 < w_4 < w_3$.

The phase difference detection module 303 may learn that a low frequency component of an obtained second modulation signal corresponding to the any second calibration excitation signal is $\tfrac{1}{2} A_0 B_0 \sin \alpha_2$, and that a low frequency component of an obtained second modulation signal corresponding to the third calibration excitation signal is $\tfrac{1}{2} A_0 B_0 \sin \alpha_3$. Therefore, a phase difference change rate of the any second calibration excitation signal may be represented as:

$$\Delta V_w = \frac{\tfrac{1}{2} A_0 B_0 \sin \alpha_2 - \tfrac{1}{2} A_0 B_0 \sin \alpha_3}{\Delta w} \qquad \text{Formula 6}$$

According to Formula 6, w in the second calibration excitation signal $B_0 \sin(wt)$ is sequentially traversed from $w_2$ to $w_3$ by the preset frequency step $\Delta w$. The processing module 304 may calculate the phase difference change rates of all the second calibration excitation signals and may use a second calibration excitation signal with a largest phase difference change rate as the target calibration excitation signal.

Figure 9:
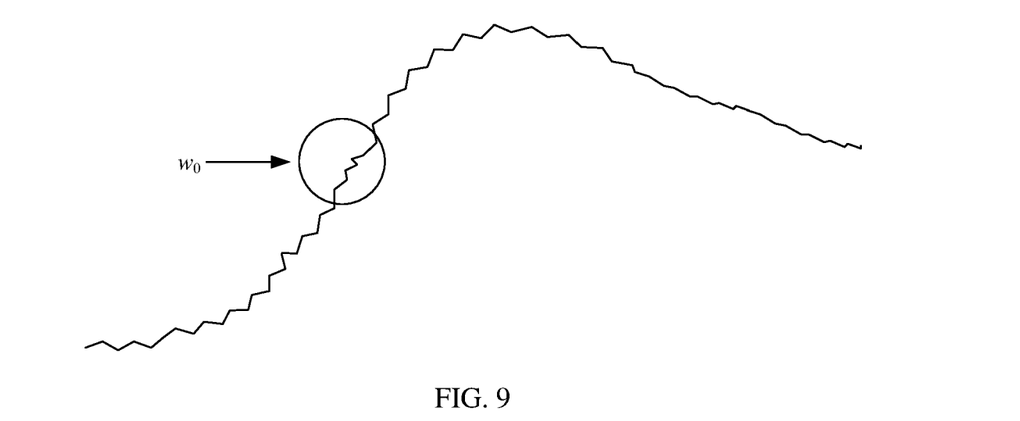
FIG. 9 is a schematic diagram of a waveform of a second curve according to an embodiment.

Optionally, in some feasible implementations, the processing module 304 may fit the second phase difference between the third calibration carrier signal and each second current signal into a second curve. The second curve is shown in FIG. 9. Because the frequency of the second calibration excitation signal is the same as a frequency of the third calibration carrier signal, that is, the frequency of the third calibration carrier signal also changes when the frequency of the second calibration excitation signal changes, the obtained second curve shown in FIG. 9 is a curve with a wave shape. However, it may be understood that each second calibration excitation signal acts on the resonant capacitor C1 and the resonant inductor L1, and even if the frequency of the third calibration carrier signal changes, frequency calibration of a detection excitation signal in this embodiment is not affected.

The second curve has a maximum curve slope at $w_0$, that is, under an action of a second calibration excitation signal whose frequency is $w_0$, the second curve has the maximum slope. In this case, the processing module 304 uses the second calibration excitation signal corresponding to $w_0$ as the target calibration excitation signal. In this embodiment, a slope of the second curve rather than an absolute value of the second phase difference may be used to determine the target excitation signal, so that an error caused by zero drift can be avoided, and precision is high.

The signal generation module 301 generates, based on the fourth indication information sent by the processing module 304, a detection excitation signal whose frequency is the frequency $w_0$ of the target calibration excitation signal. In other words, the detection excitation signal is represented as $B_0 \sin(w_0 t)$. The detection excitation signal may be used together with the detection carrier signal for foreign object detection.

For example, an implementation process of foreign object detection may be as follows: The resonant capacitor C1 and the resonant inductor L1 in the foreign object detection module 302 obtain a second detection current signal under an action of the detection excitation signal, and the phase difference detection module 303 obtains a second detection phase difference between the second detection current signal and the detection carrier signal, and determines, based on the second detection phase difference and the second detection current signal, whether a foreign object exists. For example, a second value may be obtained by dividing an amplitude of the second detection phase difference by an amplitude of the second detection current signal. If the second value falls within a preset range, no foreign object exists between the wireless charging transmitting apparatus and the wireless charging receiving apparatus; or if the second value falls beyond the preset range, a foreign object exists between the wireless charging transmitting apparatus and the wireless charging receiving apparatus.

In this embodiment, the signal generation module may generate the third calibration carrier signal and a plurality of second calibration excitation signals with different frequencies and may determine a frequency of the detection excitation signal by comparing second phase differences between the second current signals obtained from the second calibration excitation signals with different frequencies and the third calibration carrier signal. In this embodiment, the frequency of the detection excitation signal may be calibrated during foreign object detection, to avoid an error caused by a difference between the frequency of the detection excitation signal and a resonance frequency of the resonant capacitor and the resonant inductor and improve foreign object detection precision.

Figure 10:
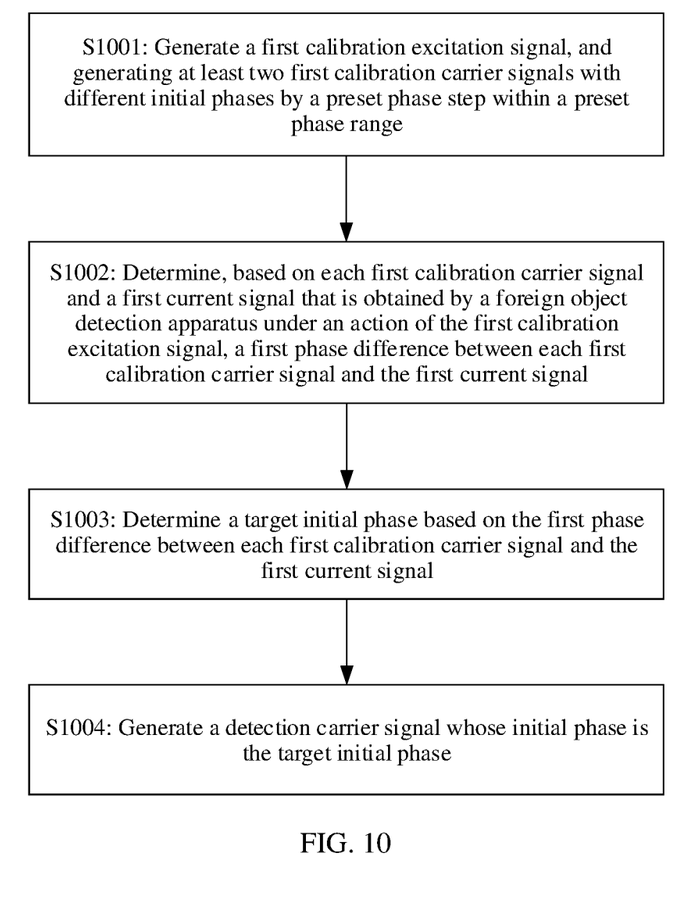
FIG. 10 is a schematic flowchart of a foreign object detection method according to an embodiment.

FIG. 10 is a schematic flowchart of a foreign object detection method according to an embodiment. As shown in FIG. 10, the foreign object detection method provided in this embodiment may include the following steps.

S1001: A controller generates a first calibration excitation signal and generates at least two first calibration carrier signals with different initial phases by a preset phase step within a preset phase range.

S1002: The controller determines, based on each first calibration carrier signal and a first current signal that is obtained by a foreign object detection apparatus under an action of the first calibration excitation signal, a first phase difference between each first calibration carrier signal and the first current signal.

In some feasible implementations, the first current signal obtained by the foreign object detection apparatus under the action of the first calibration excitation signal is modulated to a fundamental wave of each first calibration carrier signal, to obtain a first modulation signal corresponding to each first calibration carrier signal. The first phase difference between each first calibration carrier signal and the first current signal is determined based on a low frequency component of the first modulation signal corresponding to each first calibration carrier signal.

S1003: The controller determines a target initial phase based on the first phase difference between each first calibration carrier signal and the first current signal.

In some feasible implementations, the target initial phase is an initial phase of a target calibration carrier signal, and a phase difference change rate corresponding to the target calibration carrier signal is the largest in phase difference change rates corresponding to the first calibration carrier signals. In implementation, the controller may determine, based on a first phase difference between any first calibration carrier signal and the first current signal and a first phase difference between a second calibration carrier signal and the first current signal, a phase difference change rate corresponding to the any first calibration carrier signal. An initial phase of the second calibration carrier signal is greater than an initial phase of the any first calibration carrier signal by the preset phase step.

Optionally, in some feasible implementations, the controller fits the first phase difference between each first calibration carrier signal and the first current signal and an initial phase of each first calibration carrier signal into a first curve, and determines, as the target initial phase, an initial phase corresponding to a first position in the first curve. A slope of the first curve at the first position is greater than a slope of the first curve at another position.

S1004: The controller generates a detection carrier signal whose initial phase is the target initial phase. The detection carrier signal may be used by the foreign object detection apparatus for foreign object detection.

Further, in some feasible implementations, the controller may further generate a third calibration carrier signal and generate at least two second calibration excitation signals with different frequencies by a preset frequency step within a preset frequency range.

The controller determines, based on the third calibration carrier signal and each second current signal that is correspondingly obtained by the foreign object detection apparatus under an action of each second calibration excitation signal, a second phase difference between the third calibration carrier signal and each second current signal. For example, the controller modulates each second current signal that is correspondingly obtained by the foreign object detection apparatus under the action of each second calibration excitation signal to the third calibration carrier signal, to obtain a second modulation signal corresponding to each second calibration excitation signal; and determines the second phase difference between the third calibration carrier signal and each second current signal based on a low frequency component of the second modulation signal corresponding to each second calibration excitation signal.

The controller determines a target calibration excitation signal from the second calibration excitation signals based on the second phase difference between the third calibration carrier signal and each second current signal.

In some feasible implementations, a second calibration excitation signal with the largest phase difference change rate in phase difference change rates corresponding to the second calibration excitation signals may be the target calibration excitation signal. In implementation, the controller may determine, based on a second phase difference between a third carrier signal and a second current signal corresponding to any second calibration excitation signal and a second phase difference between the third carrier signal and a second current signal corresponding to a third calibration excitation signal, a phase difference change rate corresponding to the any second calibration excitation signal. A frequency of the third calibration excitation signal is greater than a frequency of the any second calibration excitation signal by the preset frequency step.

Optionally, in some feasible implementations, the controller fits the second phase difference between the third calibration carrier signal and each second current signal into a second curve, and determines, as the target calibration excitation signal, a second calibration excitation signal corresponding to a second position in the second curve. A slope of the second curve at the second position is greater than a slope of the second curve at another position.

The controller further generates a detection excitation signal whose frequency is a frequency of the target calibration excitation signal, and both the detection excitation signal and the detection carrier signal are used by the foreign object detection apparatus for foreign object detection.

It should be noted that the foregoing terms "first" and "second" are used only for description purposes and cannot be understood as an indication or implication of relative importance.

The foregoing descriptions are merely embodiments but are not intended to limit the scope of the embodiments. Any variation or replacement readily figured out by a person skilled in the art shall fall within the scope of the embodiments.

The invention claimed is:

1. A foreign object detection apparatus, comprising:
a signal generation module;
a foreign object detection module;
a phase difference detection module; and
a processing module, wherein the signal generation module is configured to:
generate a first calibration excitation signal based on first indication information received from the processing module, and
generate at least two first calibration carrier signals with different initial phases by a preset phase step within a preset phase range based on the first indication information, the phase difference detection module is configured to:
determine, based on each first calibration carrier signal and a first current signal that is obtained by the foreign object detection module under an action of the first calibration excitation signal, a first phase difference between each first calibration carrier signal and the first current signal, and the processing module is configured to:

determine a target initial phase based on the first phase difference between each first calibration carrier signal and the first current signal, and generate second indication information based on the target initial phase, wherein the second indication information is used to indicate the signal generation module to generate a detection carrier signal whose initial phase is the target initial phase, and the detection carrier signal is used for foreign object detection.

2. The foreign object detection apparatus according to claim 1, wherein the foreign object detection module further comprises:

a resonant submodule and a switch connected in parallel to the resonant submodule, wherein the first current signal is obtained from the first calibration excitation signal that passes, when the switch is closed, through a branch circuit in which the switch is disposed.

3. The foreign object detection apparatus according to claim 1, wherein the phase difference detection module is further configured to:

modulate the first current signal obtained by the foreign object detection module under the action of the first calibration excitation signal to a fundamental wave of each first calibration carrier signal, to obtain a first modulation signal corresponding to each first calibration carrier signal; and determine the first phase difference between each first calibration carrier signal and the first current signal based on a low frequency component of the first modulation signal corresponding to each first calibration carrier signal.

4. The foreign object detection apparatus according to claim 1, wherein the target initial phase is an initial phase of a target calibration carrier signal, and a phase difference change rate corresponding to the target calibration carrier signal is the largest in phase difference change rates corresponding to the first calibration carrier signals, a phase difference change rate corresponding to any first calibration carrier signal is determined based on a first phase difference between the any first calibration carrier signal and the first current signal and a first phase difference between a second calibration carrier signal and the first current signal, and an initial phase of the second calibration carrier signal is greater than an initial phase of the any first calibration carrier signal by the preset phase step.

5. The foreign object detection apparatus according to claim 1, wherein the processing module is further configured to:

fit the first phase difference between each first calibration carrier signal and the first current signal and an initial phase of each first calibration carrier signal into a first curve, and determine, as the target initial phase, an initial phase corresponding to a first position in the first curve, wherein a slope of the first curve at the first position is greater than a slope of the first curve at another position.

6. The foreign object detection apparatus according to claim 1, wherein the signal generation module is further configured to:

generate a third calibration carrier signal based on third indication information received from the processing module, and generate at least two second calibration excitation signals with different frequencies by a preset frequency step with a preset frequency range based on the third indication information,; the phase difference detection module is further configured to:

determine, based on the third calibration carrier signal and each second current signal that is correspondingly obtained by the foreign object detection module under an action of each second calibration excitation signal, a second phase difference between the third calibration carrier signal and each second current signal,; and the processing module is further configured to:

determine a target calibration excitation signal from the second calibration excitation signals based on the second phase difference between the third calibration carrier signal and each second current signal, and generate fourth indication information based on a frequency of the target calibration excitation signal, wherein the fourth indication information is used to indicate the signal generation module to generate a detection excitation signal, a frequency of the detection excitation signal is the frequency of the target calibration excitation signal, and both the detection excitation signal and the detection carrier signal are used for foreign object detection.

7. The foreign object detection apparatus according to claim 6, wherein the foreign object detection module further comprises:

the resonant submodule and the switch connected in parallel to the resonant submodule, and a resonance frequency of the resonant submodule is a frequency of the detection carrier signal and the detection excitation signal, wherein each second current signal is obtained from each second calibration excitation signal that passes, when the switch is open, through a branch circuit in which the resonant submodule is disposed.

8. The foreign object detection apparatus according to claim 6, wherein the phase difference detection module is further configured to:

modulate each second current signal that is correspondingly obtained by the foreign object detection module under the action of each second calibration excitation signal to the third calibration carrier signal, to obtain a second modulation signal corresponding to each second calibration excitation signal; and determine the second phase difference between the third calibration carrier signal and each second current signal based on a low frequency component of the second modulation signal corresponding to each second calibration excitation signal.

9. The foreign object detection apparatus according to claim 6, wherein a second calibration excitation signal with a largest phase difference change rate in phase difference change rates corresponding to the second calibration excitation signals is the target calibration excitation signal, a phase difference change rate corresponding to any second calibration excitation signal is determined based on a second phase difference between a third carrier signal and a second current signal corresponding to the any second calibration excitation signal and a second phase difference between the third carrier signal and a second current signal corresponding to a third calibration excitation signal, and a frequency of the third calibration excitation signal is greater than a frequency of the any second calibration excitation signal by the preset frequency step.

10. The foreign object detection apparatus according to claim 6, wherein the processing module is further configured to:

fit the second phase difference between the third calibration carrier signal and each second current signal into a second curve, and determine, as the target calibration excitation signal, a second calibration excitation signal corresponding to a second position in the second curve, wherein a slope of the second curve at the second position is greater than a slope of the second curve at another position.

11. A foreign object detection method, comprising:
generating a first calibration excitation signal;
generating at least two first calibration carrier signals with different initial phases by a preset phase step within a preset phase range;
determining, based on each first calibration carrier signal and a first current signal that is obtained by a foreign object detection apparatus under an action of the first calibration excitation signal, a first phase difference between each first calibration carrier signal and the first current signal;
determining a target initial phase based on the first phase difference between each first calibration carrier signal and the first current signal;; and
generating a detection carrier signal whose initial phase is the target initial phase, wherein the initial phase of the detection carrier signal is the target initial phase, and the detection carrier signal is used by the foreign object detection apparatus for foreign object detection.

12. The foreign object detection method according to claim 11, further comprising:
modulating the first current signal obtained by the foreign object detection apparatus under the action of the first calibration excitation signal to a fundamental wave of each first calibration carrier signal, to obtain a first modulation signal corresponding to each first calibration carrier signal; and
determining the first phase difference between each first calibration carrier signal and the first current signal based on a low frequency component of the first modulation signal corresponding to each first calibration carrier signal.

13. The foreign object detection method according to claim 11, wherein the target initial phase is an initial phase of a target calibration carrier signal, and a phase difference change rate corresponding to the target calibration carrier signal is the largest in phase difference change rates corresponding to the first calibration carrier signals, a phase difference change rate corresponding to any first calibration carrier signal is determined based on a first phase difference between the any first calibration carrier signal and the first current signal and a first phase difference between a second calibration carrier signal and the first current signal; and an initial phase of the second calibration carrier signal is greater than an initial phase of the any first calibration carrier signal by the preset phase step.

14. The foreign object detection method according to claim 11, further comprising:
fitting the first phase difference between each first calibration carrier signal and the first current signal and an initial phase of each first calibration carrier signal into a first curve, and
determining, as the target initial phase, an initial phase corresponding to a first position in the first curve, wherein a slope of the first curve at the first position is greater than a slope of the first curve at another position.

15. The foreign object detection method according to claim 11, further comprising:

generating a third calibration carrier signal;
generating at least two second calibration excitation signals with different frequencies by a preset frequency step within a preset frequency;
determining, based on the third calibration carrier signal and each second current signal that is correspondingly obtained by the foreign object detection apparatus under an action of each second calibration excitation signal, a second phase difference between the third calibration carrier signal and each second current signal; and
determining a target calibration excitation signal from the second calibration excitation signals based on the second phase difference between the third calibration carrier signal and each second current signal, and generating a detection excitation signal based on a frequency of the target calibration excitation signal, wherein a frequency of the detection excitation signal is the frequency of the target calibration excitation signal, and both the detection excitation signal and the detection carrier signal are used by the foreign object detection apparatus for foreign object detection.

16. The foreign object detection method according to claim 15, further comprising:
modulating each second current signal that is correspondingly obtained by the foreign object detection apparatus under the action of each second calibration excitation signal to the third calibration carrier signal, to obtain a second modulation signal corresponding to each second calibration excitation signal; and
determining the second phase difference between the third calibration carrier signal and each second current signal based on a low frequency component of the second modulation signal corresponding to each second calibration excitation signal.

17. The foreign object detection method according to claim 15, wherein a second calibration excitation signal with a largest phase difference change rate in phase difference change rates corresponding to the second calibration excitation signals is the target calibration excitation signal, a phase difference change rate corresponding to any second calibration excitation signal is determined based on a second phase difference between a third carrier signal and a second current signal corresponding to the any second calibration excitation signal and a second phase difference between the third carrier signal and a second current signal corresponding to a third calibration excitation signal, and a frequency of the third calibration excitation signal is greater than a frequency of the any second calibration excitation signal by the preset frequency step.

18. The foreign object detection method according to claim 15, further comprising:
fitting the second phase difference between the third calibration carrier signal and each second current signal into a second curve, and determining, as the target calibration excitation signal, a second calibration excitation signal corresponding to a second position in the second curve, wherein a slope of the second curve at the second position is greater than a slope of the second curve at another position.

19. A wireless charger comprising a voltage inverter and the foreign object detection apparatus according to claim 1, wherein the voltage converter is disposed between a power supply and the foreign object detection apparatus, and is configured to converts a voltage output by the power supply into a high-frequency alternating current provided for the foreign object detection apparatus.

* * * * *